United States Patent [19]

Wingler et al.

[11] 4,141,934
[45] Feb. 27, 1979

[54] CONTINUOUS BULK POLYMERIZATION PROCESS

[75] Inventors: Frank Wingler, Leverkusen; Adolf Schmidt, Cologne; Lothar Liebig; Gerd Wassmuth, both of Leverkusen, all of Fed. Rep. of Germany

[73] Assignee: Bayer Aktiengesellschaft, Leverkusen, Fed. Rep. of Germany

[21] Appl. No.: 668,984

[22] Filed: Mar. 22, 1976

[30] Foreign Application Priority Data

Mar. 26, 1975 [DE] Fed. Rep. of Germany ....... 2513253
Sep. 11, 1975 [DE] Fed. Rep. of Germany ....... 2540517

[51] Int. Cl.$^2$ ................ C08F 2/02; C08F 257/02
[52] U.S. Cl. .................... 260/881; 260/886; 526/65; 526/66; 526/227; 526/228; 526/271; 526/342; 526/347
[58] Field of Search ............ 260/881, 886; 526/65, 526/66

[56] References Cited

U.S. PATENT DOCUMENTS

| | | | |
|---|---|---|---|
| 3,753,958 | 8/1973 | Wingler et al. ........... | 526/65 |
| 4,016,342 | 4/1977 | Wagensommer ........... | 526/65 |
| 4,042,768 | 8/1977 | Müller ........................ | 526/65 |

*Primary Examiner*—Wilbert J. Briggs, Sr.
*Attorney, Agent, or Firm*—Connolly and Hutz

[57] ABSTRACT

Copolymers of
A 22 to 96 mol-% of styrene and/or α-methyl styrene,
B 0 to 78 mol-% of at least one monoolefinically unsaturated monomer containing nitrile groups, and
C 0 to 50 mol-% of at least one monoolefinically unsaturated monomer different from A or B are obtained by continuous bulk polymerization in a homogeneous liquid phase, in several process stages, in one or more different temperature ranges and in the presence of one or more initiators with different dissociation times in each temperature range and under pressures of from 1 to 20 bars.

In first stage the monomers are copolymerized with backmixing up to a conversion of from 10 – 60 mol-% in an ideally mixed tank reactor and then after optionally additional addition of further parts of monomers copolymerization is continued with backmixing in a completely flooded, self-cleaning polymerization kneader up to a residual monomer content of from 10–50 mol-%.

Residual monomers are continuously removed from the copolymer up to a content of less than 0.5% by weight based on the copolymer.

The process according to the invention provides uniform, compatible, homogeneous products which are free from gel-like particles and which combine improved transparency with greater dimensional stability under heat and better mechanical properties together with improved processability.

4 Claims, 3 Drawing Figures

CONTINUOUS BULK POLYMERIZATION PROCESS

This invention relates to a process for the production of thermoplastic, transparent moulding compositions having a high dimensional stability under heat, preferably based on styrene copolymers containing nitrile groups, by continuous bulk polymerisation in a continuously charged and ideally mixed tank reactor (process stage 1), followed by controlled further introduction of the monomer mixture (process stage 2) and polymerisation in a flooded, continuously charged polymerisation kneader with self cleaning inner surfaces which strip one another, the entire reaction zone of the polymerisation kneader being swept over by a moving mixer (process stage 3), followed by removal of the residual monomers.

The continuous bulk polymerisation of monomers which form homogeneous solutions with their polymers is known. It is also known that residual unreacted monomers can be removed on completion of the bulk polymerisation process to obtain a 100% resin. One such polymerisation process is described, for example, in DT-OS No. 2,062,976. This process uses a polymerisation chamber, part of the polymer syrup being recycled. It is also known that monomers can be polymerised in a cascade of polymerisation vessels to form a syrup and that the residual monomers can be subsequently removed in evaporation screws, as described for example in DT-OS No. 2,341,318. This type of polymerisation is only suitable for monomer mixtures of the type whose individual components do not differ too greatly from one another in their monomer reactivity, such as for example mixtures of acrylic and methacrylic ester monomers or azeotropic monomer mixtures. In the case of excessive differences in the monomer reactivity or outside azeotropic monomer compositions, the processes referred to above result in a considerable displacement in the incorporation of monomer through the reaction, so that products having broad monomer distribution are obtained, combining considerable chemical inconsistency with inadequate mechanical strengths.

Several processes have been proposed for the continuous bulk polymerisation of styrene. DT-OS No. 2,220,582 describes a process in which styrene is continuously prepolymerised in a stirred prepolymeriser, after which the syrup is polymerised to completion in a cylindrical tubular housing equipped with a number of shafts rotating in parallel with one another. The product passes through the tubular housing in the form of a plug flow, volatile material escaping from the surface of the polymer.

DT-OS No. 2,240,227 and DT-OS No. 2,240,294 described similar bulk polymerisation processes for styrene. In this case the syrups are polymerised in a vessel equipped with a paddle stirrer which is filled to a level of from 10 to 90%. At the same time, volatilising monomers are run off in order to dissipate some of the reaction enthalpy. The disadvantage of these processes is that, in continuous operation, popcorn-like gel-form polymer particles or "specks" are formed in the gas phase, resulting in hazing of the polymer and in an increase in the gas volume. Although it is possible by these processes to obtain relatively consistent polymers from monomers having different monomer reactivities, these processes nevertheless have the disadvantage that interruptions are encountered in continuous operation on a commercial scale.

In addition, the mixing effect of the described arrangements for monomers having extremely different monomer reactivities, such as for example styrene and maleic acid anhydride, is not good enough to obtain transparent, compatible polymers without any inhomogeneities.

Polymerisation processes in which screw extruders are used, such as described for example in GB-PS No. 875,853, are also unsuitable for polymerising monomers with different monomer reactivities or monomer mixtures outside the azeotropic conditions to form uniform, compatible polymers.

In addition, DT-OS No. 2,304,847 relates to a process for the continuous polymerisation of styrene with derivatives of acrylic acid and methacrylic acid, with an ideally mixed tank reactor for the initial stage and a non-remixing polymerisation in plug flow in the following stage. This process is said to provide for a certain chemical inconsistency which reduces the melting point and hence improves the levelling properties of powder resins. This process is also not intended for the production of thermoplastic moulding composition having relatively high dimensional stability under heat.

Other bulk polymerisation processes are known which either use only mixed prepolymerisations in tank reactors or loop reactors or a combination of mixed tank reactors with further polymerisation in a plug flow (tower reactor, polymerisation screws or polymerisation belts). These processes are either uneconomical or are not suitable for the production of styrene copolymers which are based on monomers with different reactivity and which are intended to give polymers with a high property level coupled with high dimensional stability under heat. Polymerization processes ae described for example in the following Patent Specifications: U.S. Pat. Nos. 3,141,868; 3,031,273; 2,989,517; 2,931,793; 2,849,430; 2,745,824; 2,530,409; 2,283,539; 2,122,805; and DT-AS No. 1,112,631.

An object of the present invention is to provide a continuous bulk polymerization process which enables styrene to be polymerized with other monomers, more especially with α-olefins containing nitrile groups which show different monomer reactivities in relation to monomeric styrene, and optionally with other copolymerisable olefinically unsaturated monomers which also have different monomer reactivities, even outside the azeotropic monomer compositions, to form transparent, compatible thermoplastic synthetic resins having a high dimensional stability under heat.

According to the invention, this object is achieved by copolymerizing the monomers having different monomer reactivities with backmixing in a continuously feded, ideally mixed tank reactor up to a conversion of from 10 to 60 mol % and, after the controlled introduction of more monomer, continuing copolymerization with remixing in a flooded, continuously feeded polymerization kneader with self-cleaning inner surfaces which strip one another, the entire interior of the polymerisation kneader being swept over by a moving mixer, up to a residual monomer content of from 10 to 50 mol %, and subsequently removing the residual monomers. Certain requirements have to be satisfied in regard to the selection of catalysts and in regard to charging of the polymerisation zones.

Accordingly, the present invention relates to a process for the continuous production of uniform, transparent, compatible thermoplastic moulding compositions from statistical copolymers having intrinsic viscosities of from 0.1 to 2 dl/g, as measured in dimethyl formamide at 25° C., and dimensional stabilities under heat of from 90° C. to 130° C., of copolymerised units of monomers with monomer reactivities different from A, more specifically of A 22 to 96 mol % of styrene or α-methyl styrene or a mixture thereof, B 0 to 78 mol % of at least one monoolefinically unsaturated monomer containing nitrile groups, and C 0 to 50 mol % of at least one monolefinically unsaturated monomer different from A or B — the sum of A, B and C amounting to 100 mol % — by continuous bulk polymerisation in a homogeneous liquid phase, in several process stages, in one or more different temperature ranges and in the presence of one or more initiators with different dissociation times in each temperature range and under pressures of from 1 to 20 bars, distinguished by the fact that, in the first process stage carried out at temperatures of from 60° C. to 150° C. in the presence of an initiator having a half life (at the polymerisation temperature) of $\leq$ 1/10th of the average residence time and $\geq$ the mixing time in a continuous-feeded, ideally mixed tank reactor, with average residence times of from 10 to 240 minutes and mixing times of from 5 to 120 seconds, 100 parts by weight of a monomer mixture of $A_1$ 4 to 99.6 mol % of styrene, α-methyl styrene or a mixture thereof, $B_1$ 0 to 96 mol % of at least one monoolefinically unsaturated monomer containing nitrile groups, and $C_1$ 0 to 80 mol % of at least one monoolefinically unsaturated monomer different from $A_1$ or $B_1$, per unit of time are copolymerised with backmixing up to a conversion of from 10 to 60 mol % to form the copolymer with the composition ABC, and, in a second process stage, from 0.5 to 100 parts by weight per unit of time of a monomer mixture consisting of $A_2$ 0 to 100 mol % of styrene, α-methyl styrene or a mixture thereof, $B_2$ 0 to 100 mol % of at least one monoolefinically unsaturated monomer containing nitrile groups, and $C_2$ 0 to 100 mol % of at least one monoolefinically unsaturated monomer different from $A_2$ or $B_2$, — the sum of the mol % of $A_1B_1C_1$ and $A_2B_2C_2$, respectively, always amounting to 100 —and from 0.01 to 0.5% by weight, based on the sum of residual monomers of $A_1B_1C_1$ and of monomers $A_2B_2C_2$, of an initiator having a half life (at the polymerisation temperature of process stage 3) of $\leq$ 1/10th of the residence time and $\leq$ the mixing time, are added to the polymerisation mixture per unit of time and, in a third process stage, carried out continuously in homogeneous phase, in bulk, in a completely flooded, self-cleaning polymerisation kneader with mobile kneading fittings which sweep over the entire inner volume of the polymerisation kneader and completely strip both the wall and one another, copolymerisation is continued with backmixing at a temperature of from 100° C. to 250° C. over an average residence time of from 10 to 480 minutes and with mixing times of from 0.1 to 4 minutes, up to a residual monomer content of from 10 to 50 mol %, based on the total monomers, and the copolymer ABC containing residual monomers is continuously freed from the residual monomers by applying a vacuum or by blowing in an inert gas, until the residual monomer content amounts to less than 0.5% by weight, based on the copolymer.

In principle, this process may also be used for the bulk polymerisation of monomers having similar reactivities or azeotropically polymerising monomer mixtures or monomer mixtures with compositions close to the azeotropic composition, although other processes may be used with equal effect for this purpose, such as for example combined polymerisation in a mixed preliminary reactor and a polymerisation screw. Accordingly, the advantage of the process according to the invention is particularly apparent in the polymerisation of monomers with different reactivities and in the polymerisation of monomer mixtures outside the azeotropic monomer compositions, especially when the combination of a mixed preliminary reactor with a polymerisation screw does not give uniform, compatible polymers which are dimensionally stable under heat. In this case, the process according to the invention provides uniform, compatible, homogeneous products which are free from gel-like particles and which combine improved transparency with greater dimensional stability under heat and better tensile, flexural and impact strengths together with improved processibility.

Another advantage of the process according to the invention is that it enables styrene in particular to be copolymerised with a monomer containing nitrile groups and another monomer free from nitrile groups in a wide concentration range to form transparent, clear, compatible thermoplastic plastics. In conventional processes, for example polymerisation in a cascade of stirred vessels, as described for example in U.S. Pat. No. 2,829,128, transparent, clear plastics are only obtained in very narrow concentration ranges which lie in the vicinity of azeotropic polymerisation conditions.

The process according to the invention is preferably used for the production of copolymers comprising copolymerised units of A 22 to 96 mol % of styrene or α-methyl styrene or a mixture thereof, B 0 to 74 mol % of at least one monoolefinically unsaturated monomer containing nitrile groups with a monomer reactivity different from A, and C 4 to 50 mol % of at least one monoolefinically unsaturated monomer different from A or B with a monomer reactivity different from A — the sum of the mol % of A, B and C amounting to 100 —

100 parts by weight per unit of time of a monomer mixture of $A_1$ 4 to 99.6 mol % of the monomers mentioned in A above, $B_1$ 0 to 70 mol % of the monomers mentioned in B above, and $C_1$ 0.4 to 50 mol % of the monomers mentioned in C above — the sum of the mol % of $A_1$, $B_1$ and $C_1$ amounting to 100 — being used in the first stage of the process, and from 0.5 to 60 parts by weight per unit of time of a monomer mixture of $A_2$ 0 to 100 mol % of the monomers mentioned in A above, $B_2$ 0 to 100 mol % of the monomers mentioned in B above and $C_2$ 0.4 to 100 mol % of the monomers mentioned in C above — the sum of the mol % of $A_2$, $B_2$ and $C_2$ amounting to 100 — being used in the second stage of the process.

The following copolymers are of particular interest: copolymers comprising copolymerised units of A 22 to 96 mol % of styrene or α-methyl styrene or a mixture thereof, B 0 to 45 mol % of at least one monoolefinically unsaturated monomer containing nitrile groups with a monomer reactivity different from A, C 4 to 33 mol % of at least one monoolefinically unsaturated monomer different from A or B and with monomer reactivities different from A, 100 parts by weight per unit of time of a monomer mixture of $A_1$ 4 to 99.6 mol % of the monomers mentioned in A above, $B_1$ 0 to 70 mol % of the monomers mentioned in B above, and $C_1$ 0.4 to 50 mol % of the monomers mentioned in C above, being used in the first stage of the process, and 0.5 to 100 parts by weight per unit of time of a monomer mixture of $A_2$ 0 to 100 mol % of the monomers mentioned in A above, $B_2$ 0 to 100 mol % of the monomers mentioned in B above, and $C_2$ 0 to 100 mol % of the monomers mentioned in C above — the sum of the mol % always amounting to 100 — being used in the second stage.

The following copolymers are also of particular interest: copolymers comprising copolymerised units of A 72 to 93 mol % of styrene or α-methyl styrene or a mixture thereof, B 3 to 13 mol % of acrylonitrile or methacrylonitrile or a mixture thereof, and C 4 to 15 mol % of at least one monoolefinically unsaturated monomer different from A or B and with monomer reactivities different from A, 100 parts by weight per unit of time of a monomer mixture of $A_1$ 50 to 98.6 mol % of the monomers mentioned in A above, $B_1$ 1 to 20 mol % of the monomers mentioned in B above, and $C_2$ 0.4 to 30 mol % of the monomers mentioned in C above, being used in the first stage of the process, and 0.5 to 100 parts by weight per unit of time of a monomer mixture of $A_2$ 0 to 100 mol % of the monomers mentioned in A above, $B_2$ 0 to 100 mol % of the monomers mentioned in B above, and $C_2$ 0 to 100 mol % of the monomers mentioned in C above — the sum of the mol % always amounting to 100 — being used in the second stage of the process.

The monomers of group A (and $A_1$ and $A_2$) are styrene and α-methyl styrene, preferably styrene.

Preferred monomers of Group B (and $B_1$ and $B_2$) are acrylonitrile, methacrylonitrile, α-chloroacrylonitrile, α-cyanoacrylic acid and alkyl esters thereof having 1 to 8 carbon atoms in the alcohol component, ethylidene cyanoacetic acid and alkyl esters thereof having 1 to 8 carbon atoms in the alcohol component, α-cyanosorbic acid and alkyl esters thereof having 1 to 8 carbon atoms in the alcohol component, methylene malonic acid dinitrile and ethylidene malonic acid dinitrile, maleic acid dinitrile and fumaric acid dinitrile. Acrylonitrile and methacrylonitrile are particularly preferred.

Preferred monomers of Group C (and $C_1$ and $C_2$) are acrylic and methacrylic acid alkyl esters, cycloalkyl esters, phenyl esters and benzyl esters, more especially alkyl esters having 1 to 12 carbon atoms in the alcohol component, (meth)acrylic acid hydroxy alkyl esters having 2 to 6 carbon atoms in the alkyl group, secondary and tertiary amino alkyl esters of (meth)acrylic acid having 2 to 4 carbon atoms in the alkyl radical, (meth)acrylic acid, (meth)acrylic acid amide, N-alkyl-(meth)acrylamide having 1 to 8 carbon atoms in the alkyl radical, N-dialkyl-(meth)acrylamide having 1 to 8 carbon atoms in the alkyl radical, 2-isocyanatoethyl-(meth)acrylate, 2-methoxy ethyl(meth)acryate, glycidyl(meth)acrylate, crotonic acid, crotonic acid amide and cinnamic acid;

mono-$C_1$-$C_{10}$-alkyl and di-$C_1$-$C_{10}$-alkyl esters and monocyclohexyl and dicyclohexyl esters, also monobenzyl and dibenzyl esters of α,β-unsaturated dicarboxylic acids having 3 to 5 carbon atoms, as well as these acids themselves, their anhydrides, their monoamides and diamides and cyclic imides; monoolefins having 3 to 8 carbon atoms, such as propene, isobutylene or diisobutylene; vinyl esters of aliphatic $C_1$-$C_{12}$-carboxylic acids; vinyl chloride, vinylidene chloride, vinyl fluoride, vinyl isocyanate, isopropenyl isocyanate, vinyl oxazolines, vinyl oxazolidones, N-vinyl pyrrolidone, 2-vinyl pyridine, 4-vinyl pyridine, diethoxy ethyl vinyl silane, diethoxy methyl vinyl silane, trimethoxy vinyl silane, trimethyl vinyl silane and allyl acetate; isopropenyl phenol; vinyl alkyl ethers having 1 to 8 carbon atoms in the alkyl radical and o-, m-, p-chlorostyrene, α- and p-cyanostyrene, o-, m-, p-methyl styrene, p-methoxy styrene, p-isopropyl styrene, 2,4-dimethyl styrene and 2,5-dimethoxy styrene; preferred monomers of group C (and $C_1$ and $C_2$) are aliphatic esters of (meth)acrylic acid having 1 to 8 carbon atoms in the alcohol radical, (meth)acrylic acid, maleic acid, maleic acid anhydride, maleic acid semiesters and maleic acid diesters having 1 to 8 carbon atoms in the alcohol radical, N-cyclohexyl maleic acid imide, fumaric acid semiesters and diesters with 1 to 8 carbon atoms in the alcohol radical, propylene, vinyl acetate and 2-vinyl oxazoline.

The above-mentioned maleic and fumaric acids and their above-mentioned derivatives are particularly preferred, as are acrylic acid, methacrylic acid, vinyl acetate, methyl methacrylate and propylene.

Particular reference is made to the following copolymers comprising the following monomer combinations: styrene-maleic acid anhydride; α-methyl styrene-acrylonitrile; styrene-acrylonitrile-methacrylonitrile; styrene-α-methyl styrene-acrylonitrile; α-methyl styrene -acrylonitrile-methacrylonitrile; styrene-acrylamide-methyl methacrylate; styrene-methacrylamide-methyl methacrylate; styrene-methacrylic acid-methyl methacrylate; styrene-maleic acid anhydride-methyl methacrylate; styrene-maleic acid anhydride-vinyl acetate; styrene-acrylonitrile-maleic acid anhydride; styrene-acrylonitrile-methacrylic acid; styrene-acrylonitrile-methyl methacrylate; styrene-acrylonitrile-tert.-butyl acrylate; styrene-methacrylonitrile-maleic acid anhydride; styrene acrylonitrile-N-cyclohexyl maleic imide, styrene-acrylonitrile-maleic acid semiester; styrene-acrylonitrilefumaric acid semiester; styrene-acrylonitrile-maleic acid diester; styrene-acrylonitrile-fumaric acid diester, the alcohol component of the semiester or diester consisting of aliphatic monohydric alcohols having 1 to 8 carbon atoms or cyclohexanol; styrene-acrylonitrile-methylvinyl ketone; styrene-acrylonitrile-butyl methacrylate; α-methyl styrenemethacrylonitrile-methyl methacrylate; styrene-acrylonitrilevinyl acetate; styrene-acrylonitrile-methyl acrylate; styrene-methacrylonitrile-butyl methacrylate; styreneacrylonitrile-methacrylonitrile and a methacrylic acid or acrylic acid alkyl ester having 1 to 8 carbon atoms in the alcohol component; styrene-acrylonitrile-vinyl acetate-maleic acid anhydride; and α-methyl styrene-acrylonitrilemethacrylic acid anhydride-styrene.

As already mentioned, the surprising advantage of the process according to the invention is that monomers with different monomer reactivities can be polymerised to form transparent, clear, inherently compatible thermoplastic plastics. The monomer reactivities are defined by the Q-e-values or by the copolymerisation parameters (r-values), also known in Anglo-Saxon usage as "Monomer-Reactivity Ratio" (cf. H. G. Elias, Makromolekule, Huthig and Wepf-Verlag, Heidelberg, 1972). These parameters (Q-e-values or r-values) are nowadays tabulated for almost all common monomers and are available to any expert (cf. Brandrup and E. H. Immergut, Polymer Handbook, Interscience Publishers, New York 1966). They can also be determined in known manner (cf. H. G. Elias, Makromolekule, Huthig and Wepf Verlag, Basel, 1971, page 541).

Monomers having similar reactivities are, for example styrene and methyl methacrylate with the copolymerisation parameters r styrene = 0.54 and r methyl methacrylate = 0.46.

Figure 1:
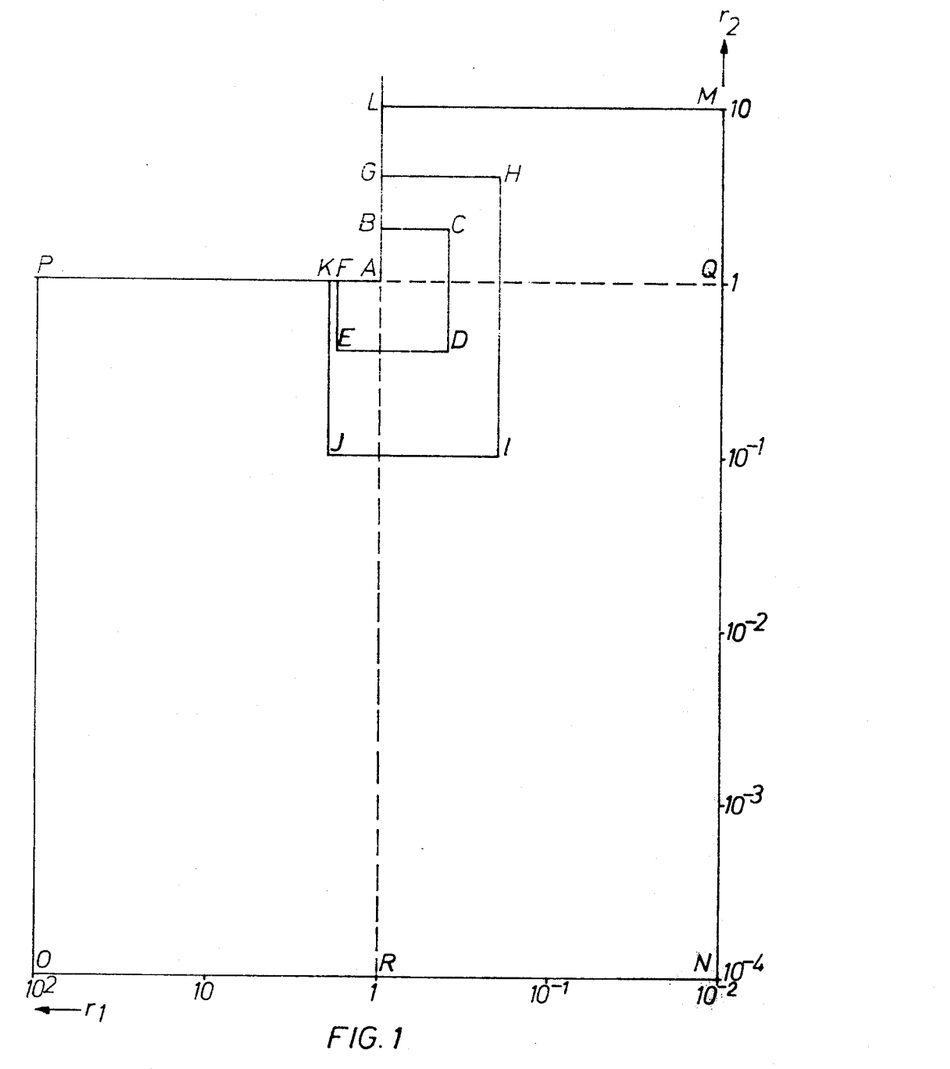

Monomers whose reactivity differs, in some cases considerably, from that of styrene and α-methyl styrene are the monomers mentioned in groups B (and $B_1$ and $B_2$) and C (and $C_1$ and $C_2$) of this Application. These differences can be clearly illustrated for binary systems, for example in relation to styrene (α-methyl styrene), by means of an $r_1/r_2$ graph (cf. FIG. 1). In this graph, the copolymerization parameters $r_1$ for styrene (α-methyl styrene) are recorded on a logarithmic scale on the ordinate and, on the abscissa, for the monomers with the copolymerisation parameters $r_2$. The hexagon ABCDEF ($r_1$ 0.4 to 1.8, $r_2$ 0.4 to 2) represents the boundaries of values for monomers of similar reactivity, whilst the polygon GHIJKEDCB ($r_1$ 0.2 to 2, $r_2$ 0.1 to 4) represents the boundaries of values for monomers of different reactivity. The polygon LMNOPKJIHG ($r_1$ 0.01 to 100, $r_2$ $10^{-5}$ to 10) represents the boundaries of values for monomers with extremely different reactivity. The rectangle AQNR represents the boundaries of values for monomer couples for which may exist also azeotropic compositions ($r_1 + r_2 \leq 1$).

The term "under stationary conditions" used in the present Application means that the concentrations of all the reactants and the compositions of the products formed remain substantially constant throughout the polymerisation time. In addition, the reaction parameters, such as residual monomer compositions, viscosities of the polymerisation mixtures, temperatures, initator concentrations and conversions, are also substantially constant as a function of time. The polymer formed and residual monomers are run off from the reaction zones in quantities commensurate with those in which the starting monomers are added. In the polymerisation zones of process stages 1 and 3, stable stationary conditions are established after about 0.5 to 24 hours, as measured from the beginning of the polymerisation reaction.

Under the stationary polymerisation conditions, differential and integral compositions of the polymers are the same and the ratio of the polymer composition to the residual monomer composition obtained is governed by the degree of conversion. The differential composition is the composition of that polymer which is being formed at a certain time, whilst the integral composition is the gross composition of the polymer which has been formed over a certain period of time.

Admixture is said to be "ideal" when the mixing time is 1/10th or less than the average residence time. This condition must be fulfilled in the first stage of the process. In this stage, the average residence time can amount to between 10 and 20 minutes and preferably to between 20 and 120 minutes, whilst the mixing times amount to between 5 and 120 seconds and preferably to between 5 and 30 seconds. Although the re-admixture in the third process stage does not have to be "ideal", the mixing time in this stage of the process should preferably be no longer than 1/5th of the average residence time. In the third stage of the process, the average residence times may account to between 10 and 480 minutes and preferably to between 20 and 180 minutes. The component added should be distributed substantially uniformly throughout the reaction zone within the mixing times. In other words differences in concentration greater than 10% should not occur during the mixing time in the reaction zone following the addition of, for example, a dye.

In order to produce polymers having a certain required composition, it is essential to know the monomer composition which gives the required gross composition for a certain conversion, because it is only when conversion is complete that the composition of the starting monomers is the same as that of the end product. With conversions of less than 100%, the composition of the starting monomers differs from the product composition because the individual monomers are incorporated in the polymer at different rates.

By means of an equation formulated by Alfrey and Goldfinger and by virtue of the known, tabulated copolymerisation parameters, it is now possible for any expert to calculate the gross polymer composition which corresponds to a certain starting monomer composition under stationary conditions. By means of electronic calculators of the type now commonly available to the public, it is possible by totalling small conversion steps to calculate the gross composition for any conversion.

The Alfrey-Goldfinger equation, whose correctness has been confirmed in several cases, is as follows, for example for a terpolymerization reaction:

$$Q_1 = [M_1]\left(\frac{[M_1]}{r_{31}r_{21}} + \frac{[M_2]}{r_{21}r_{32}} + \frac{[M_3]}{r_{31}r_{23}}\right)$$

$$\left([M_1] + \frac{[M_2]}{r_{12}} + \frac{[M_3]}{r_{13}}\right)$$

$$Q_2 = [M_2]\left(\frac{[M_1]}{r_{12}r_{31}} + \frac{[M_2]}{r_{12}\,r_{32}} + \frac{[M_3]}{r_{32}r_{13}}\right) +$$

$$\left([M_2] + \frac{[M_1]}{r_{21}} + \frac{[M_3]}{r_{23}}\right)$$

$$Q_3 = [M_3]\left(\frac{[M_1]}{r_{13}r_{21}} + \frac{[M_2]}{r_{23}r_{12}} + \frac{[M_3]}{r_{13}r_{23}}\right)$$

$$\left([M_3] + \frac{[M_1]}{r_{31}} + \frac{[M_2]}{r_{32}}\right)$$

where $d[M_1]: d[M_2]: d[M_3] = Q_1:Q_2:Q_3$.

The copolymerisation parameter r is derived from the ratios of the growth constant k in accordance with the following:

$$r_{12} = k_{11}/k_{12}; \quad r_{21} = k_{22}/k_{21}; \quad r_{31} = k_{33}/k_{31}$$

$$r_{13} = k_{11}/k_{13}; \quad r_{23} = k_{22}/k_{23}; \quad r_{32} = k_{33}/k_{32}$$

M is the particular monomer concentration (mol/liter). (cf. T. Alfrey and G. Goldfinger, J. chem. Phys. 12, 322 (1944); T. Alfrey, F. R. Mayo and F. T. Wall, J. Polymer Sci. 1, 581 (1946); T. Alfrey, J. J. Bohrer, U. H. Mark, Copolymerisation Interscience, New York, London 1952, page 126; R. J. Slocombe, Journal of Polymer Sci. 26, 9 (1957); D. Braun, G. Mott, Angew. Makromol. Chem. 18, 183 1971); T. T. Szabo, E. B. Naumann, R. T. Blanks, Hydrocarbon Processing 45, 215 (1966); A. Ravve, J. T. Khamis and L. X. Mallavarapu, J. Plymer Sci., Part A, 3 1775 (1965); P. Frank and v. Mises, Differentialgleichungen in der Physik, Viehweg Verlag, Brunswich, 1961, Vol. 1, page 290).

To carry out the process according to the invention, it is necessary to select the concentrations of the monomers in the starting monomer mixtures $A_1B_1C_1$ and in the residual monomer mixtures, before further polymerisation in accordance with process stage (3), in such a way that polymers lying within the gross composition ABC are always formed at the required degree of conversion. The associated starting monomer composition may be determined by tests in which it is varied for a given conversion until the polymer of the required gross composition within the limits of ABC is formed. It is more simple to calculate the monomer compositions which give the required copolymer for a given conversion on the basis of the copolymerisation equation described above from the tabulated copolymerisation parameters known from the literature or from the determined copolymerisation parameters or from Q-e-values (resonance and polarisation terms). In order to improve accuracy, the calculated monomer compositions may be slightly corrected by tests in order to obtain the exact gross polymer composition required. In order to be able to determine the concentrations on the basis of the copolymerisation equation under stationary conditions and with corresponding conversions, it is necessary to carry out the following operations, as explained with reference to a concrete example (Example 1, page 27). The copolymer ABC is only formed when a certain residual monomer composition is present. It follows from the copolymerisation parameters of the ternary mixture styrene, acrylonitrile and maleic acid anhydride, that a residual monomer mixture of 65.44 mol % of styrene (S), 33.98 mol % of acrylonitrile (AN) and 0.58mol % of maleic acid anhydride (MA), with $r_{SAN} = 0.37$, $r_{ANS} = 0.07$, $r_{SMA} = 10^{-2}$, $r_{MAS} = 10^{-4}$, $r_{ANMA} = 6.0$, $r_{MAAN} = 10^{-4}$, corresponds under stationary conditions (integral polymer composition = differential polymer composition) to a polymer of the following composition: 55.29 mol % of styrene, 29.69 mol % of acrylonitrile and 15.02 mol % of maleic acid anhydride (polymer composition ABC). Both concentrations are in equilibrium under stationary conditions.

In Example 1, 100 parts by weight of the monomer mixture $A_1B_1C_1$ per unit of time are used, polymerisation is continued to a conversion of 27% by weight in process stage (1) and 27 parts by weight of a polymer with the above composition (ABC) per unit of time are obtained. Accordingly, 73 parts by weight of residual monomer with the above composition are run off per unit of time from process stage (1). It follows from the mass balance that 100 parts by weight per unit of time of a starting monomer mixture with the composition: 62.72 mol % of styrene, 32.83 mol % of acrylonitrile and 4.44 mol % of maleic acid anhydride (starting monomer composition $A_1B_1C_1$) must be added to the mixed tank reactor used for process stage (1). In order also to obtain a polymer with the composition ABC of 55.29 mol % of styrene, 29.69 mol % of acrylonitrile and 15.02 mol % of maleic acid anhydride, for example in the polymerisation kneader (process stage 3), it is necessary to maintain in the kneader a residual monomer composition of 65.44 mol % of styrene, 33.98 mol % of acrylonitrile and 0.58 mol % of maleic acid anhydride in the same way as before (process stage 1). Another 67 parts by weight of polymer per unit of time are intended to be formed in process stage (3). According to the mass balance, 100 parts by weight per unit of time of monomers having the composition: 58.69 mol % of styrene, 31.12 mol % of acrylonitrile and 10.20 mol % of maleic acid anhydride, must be introduced to obtain this result. 73 parts by weight per unit of time are available as a residual monomer mixture from process stage (1), so that 27 parts by weight per unit of time of monomers $(A_2B_2C_2)$ having the following composition must be added to the syrup in process stage (2): 39.69 mol % of styrene, 23.09 mol % of acrylonitrile and 37.22 mol % of maleic acid anhydride, in order to obtain 100 parts by weight per unit of time of a monomer mixture with the following composition: 55.29 mol % of styrene, 29.69 mol % of acrylonitrile and 15.02 mol % of maleic acid anhydride. In all 94 parts by weight of a polymer with the composition ABC are produced per unit of time. Accordingly, the total conversion amounts to 74% by weight or to 73.1 mol %, based on all the monomers. Problems of this kind can nowadays be solved quickly and easily by means of electronic calculators.

The process according to the invention is carried out in three stages, the first stage being carried out in an ideally mixed tank reactor. In the context of the invention, a tank reactor is a reaction vessel provided with an inlet, an outlet, a stirrer and a device for dissipating the heat of reaction. It is distinguished from a tube reactor by the length-to-width ratio which, in the case of a tank reactor, should amount to between 1:1 and 6:1. Suitable stirrers are intensive stirrers such as, for example, impeller stirrers, helical or loop-type stirrers, anchor stirrers and propeller stirrers. In order to improve admixture polymer syrup may also be continuously removed from the bottom of the reactor and recycled to the top of the reactor, or vice versa. The tank reactor may also be provided with a reflux condenser for dissipating the enthalpy of the reaction by vapour cooling.

Instead of using only one ideally mixed tank reactor, it is also possible in exceptional cases to use two or even three ideally mixed tank reactors arranged one behind the other.

The initiator is continuously introduced into the tank reactor together with the monomer mixture. The tank reactor should not be flooded, but should preferably be filled to between 50 and 75% of its volume. Process stage 1 is carried out with backmixing under pressures of from 1 to 20 bars, but preferably at atmospheric pressure. The polymerisation temperatures are in the range of from 60° C. to 150° C. In order to reduce molecular weight, chain terminators or transfer agents, such as n- or tert.-dodecyl mercaptan, thioglycol, thioglycerol, cyclohexene, allyl alcohol, methylvinyl carbinol or carbon tetrachloride, may be added in quantities of from 0.1 to 2% by weight, based on the monomer. The reaction product is removed from the tank reactor at a rate commensurate with that at which fresh starting mixture is introduced.

The polymer syrup removed, which has a viscosity of from 1 to 1000 poises at 60° to 150° C., as measured by a rotary viscosimeter, is continuously mixed in process stage 2 with new initiators and new monomers under the conditions and in accordance with the procedure described above. Mixing may be carried out in a stirred container or even in pipes using so-called static mixers, i.e. fixed pipe fittings which continuously divert the product stream. The polymer syrup may be additionally cooled by means of heat exchangers to temperatures of from 20° C. to 140° C. The mixture is pumped under a pressure of from 1 to 20 bars into the flooded, i.e. completely filled (polymerisation kneader) process stage 3 and polymerized with backmixing under these pressures.

The polymerisation kneader must be completely flooded, because otherwise specks occur in the material after prolonged polymerisation. In addition, all the surfaces must be self-cleaning in order to avoid caking.

Figure 2A:
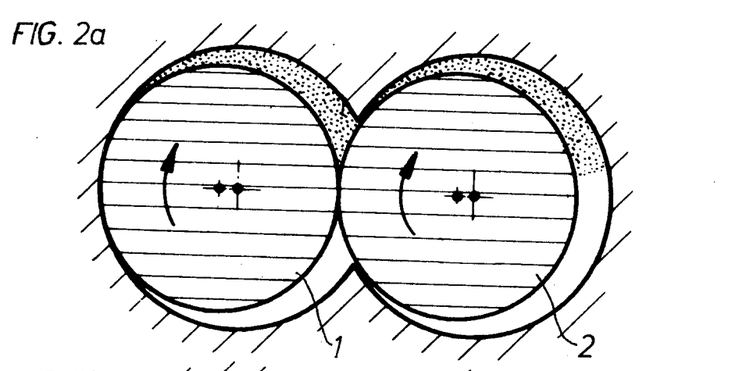
Figure 2B:
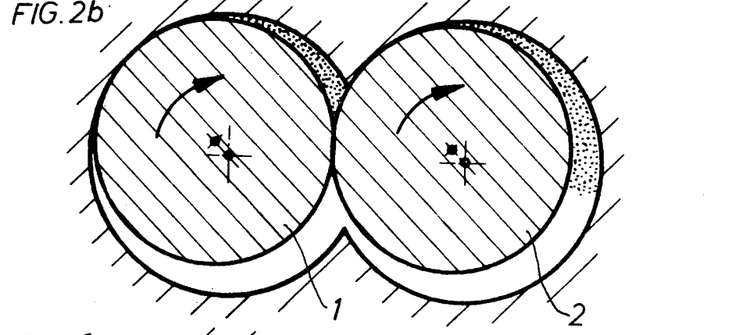
Figure 2C:
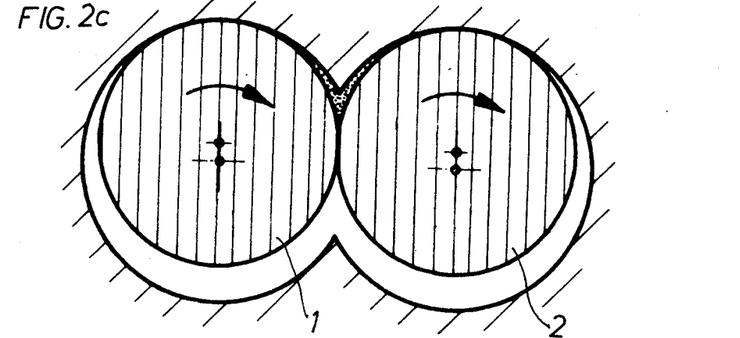

In addition, the material obtained after prolonged polymerisation is only free from specks when the entire contents of the polymerisation kneader are completely removed at regular intervals. The polymerisation kneader is not provided with any displacement-type stirrers. However, discharge elements with a conveying action may be provided for discharging the polymer mixture. A reactor suitable for this process is described in DT-OS No. 2,253,356 and consists essentially of a figure 8-shaped housing with two eccentric, smooth tubes which are surrounded by the figure 8-shaped housing and which rotate in the same direction and at the same angular speed. FIG. 2 diagrammatically illustrates the polymerisation kneader system:

The circles 1 and 2 touch one another and also the inner surface of the housing in each angular position (a,b,c), i.e. satisfy the requirement for complete, internal stripping of the system. The tubes and the surrounding housing may be heated or cooled in the usual way.

Instead of using one polymerisation kneader, it is also possible to use several kneaders arranged in series.

The polymerisation temperatures in process stage 3 are in the range of from 100° C. to 250° C.

The reaction product issuing from the polymerisation kneader, which has a viscosity of from 10 to 10,000 poises at 100° to 250° C., as measured by a rotary viscosimeter, has to be freed from the residual monomers. To this end, the syrup may either be concentrated by evaporation under reduced pressure in further apparatus, or may be freed from volatile constituents by blowing in an inert gas. Concentration by evaporation under reduced pressure is carried out by flash evaporation, screw evaporation, thin-layer evaporation, falling-film evaporation or spray drying. Processes of this type are described by R. Erdmenger in Maschinenmarkt, Wurzburg, Vol. 80, (1974) number 1, page 2 and number 10, page 148.

Concentration by blowing in an inert gas is carried out in so-called tubular-coil evaporators. In this case, the hot polymer syrup is conveyed through a long, heated helical tube with an inert gas such as nitrogen, carbon dioxide or steam, the material being thoroughly admixed on the surface of the tube under the effect of the turbulence generated.

After concentration by evaporation, the content of volatile constituents should amount to less than 0.5% by weight. The resin may be cooled by conventional methods such as, for example, extrusion, quenching with cold water, or cooling on belts or squeezing rollers, and may then be granulated and packaged.

The residual monomers may be added optionally after preparation of the fresh starting monomer mixture, again taking concentration into account. In order to reduce the viscosities, inert additives, such as levelling agents, stearates, waxes, viscosity-lowering liquids, such as ethyl benzene, toluene, benzene or tert-butanol, may also be added in quantities of from 0.1 to 30% by weight, based on the monomer total, throughout the process and may optionally be separated off thereafter, optionally by the concentration methods described above. Stabilisers, such as tert-butyl phenols or hydroquinone monomethyl ether, may also be added in quantities of from 10 to 1000 ppm to the monomers added.

In each stage, the conversion may be adjusted in known manner by suitably selecting the initiator, initiator concentration, temperature and average residence time.

In order to check the conversion in each stage, the density of the polymer syrup or its viscosity may be used as a controlled variable in automatic control systems for maintaining certain conversions. It is best to use the initiator input as a controlled quantity.

In the first stage of the process, the conversion should amount to between 10 and 60 mol % and preferably to between 20 and 40 mol %, based on the starting monomers $A_1B_1C_1$. The conversion in the third stage of the process should amount to between 10 and 80 mol % and preferably to between 20 and 70 mol %, based on the monomers introduced into the polymerisation kneader, i.e. on the sum of residual monomers from $A_1B_1C_1$ and monomers $A_2B_2C_2$. However, the maximum conversion in stages 1 and 3 together should amount to between 50 and 90 mol %, based on monomers $A_1B_1C_1$ + $A_2B_2C_2$ (monomer total). In other words, polymerisation is continued up to a residual monomer content of from 10 to 50 mol %, based on the monomer total.

The initiators used in the first and third stages of the process have a half life at the polymerisation temperature which amounts to 1/10th or less ($\leq$) of the average residence time and which is equal to or greater than ($\geq$) the mixing time. If these conditions are not fulfilled, the products obtained are inhomogeneous and inherently incompatible.

Initiators for process stage 1, i.e. for polymerisation temperatures of from 60° to 150° C., are for example tert-butyl perpivalate, benzoyl peroxide, p-chlorobenzoyl peroxide, tert-butylperoctoate, azodiisobutyrodinitrile, diisopropyl peroxy dicarbonate, diethyl hexyl peroxy dicarbonate, lauroyl peroxide and cyclohexyl sulphonyl peracetate.

Initiators for process stage 3, i.e. for polymerisation temperatures of from 100° to 250° C., are for example tert-butyl peroctoate, di-benzoyl peroxide, tert-butyl perbenzoate, di-tert-butyl peroxide, tert-butyl hydroperoxide, dicumyl peroxide and cumyl hydroperoxide.

The initiators are used in quantities of from 0.01 to 0.5% by weight in process stages 1 and 3. In process stage 1, the quantities are based on the monomer mixture $A_1B_1C_1$ and, in process stage 3, on the sum of residual monomers from $A_1B_1C_1$ and the monomer mixture $A_2B_2C_2$.

The parts and percentages quoted are parts and percentages by weight, unless otherwise stated.

The copolymers obtained in accordance with the invention have average molecular weights (weight average) of from $10^4$ to $10^6$, preferably from $5.10^4$ to $5.10^5$, calculated on the basis of their intrinsic viscosities of from 0.1 to 2 dl/g, preferably from 0.4 to 1.2 dl/g, as measured in dimethyl formamide at 25° C.

The copolymers have dimensional stabilities under heat according to Vicat of from 90° to 130° C. The thermoplastic resins are transparent and crystal-clear. Their permeability to light, as measured at 600 nm, amounts to at least 70% in layer thicknesses of 4 mm. The resins have a notched impact strength according to DIN 7741 of from 2.0 to 10 kp/cm², and a melt index of from 2.8 to 20 g/10', as measured in accordance with ASTM D 1238-65 T at a temperature of 200° C. under a load of 21.6 kp. The resins obtained by the process according to the invention are used as thermoplastic moulding compositions for injection moulding, deep-drawing and moulded articles such as tableware, fittings, domestic appliances, internal trim for motor vehicles and boats, in optics and in electronics. They are distinguished by their resistance to boiling water. In addition, they are eminently suitable for processing in injection-moulding machines by virute of their favourable melt flow properties. By virtue of their nitrile content and their impermeability to gases and aromas, the materials are also suitable for the production of films and containers for packaging foods. By virtue of their high permeability to light, they are suitable for the production of optical lens material.

Figure 3:
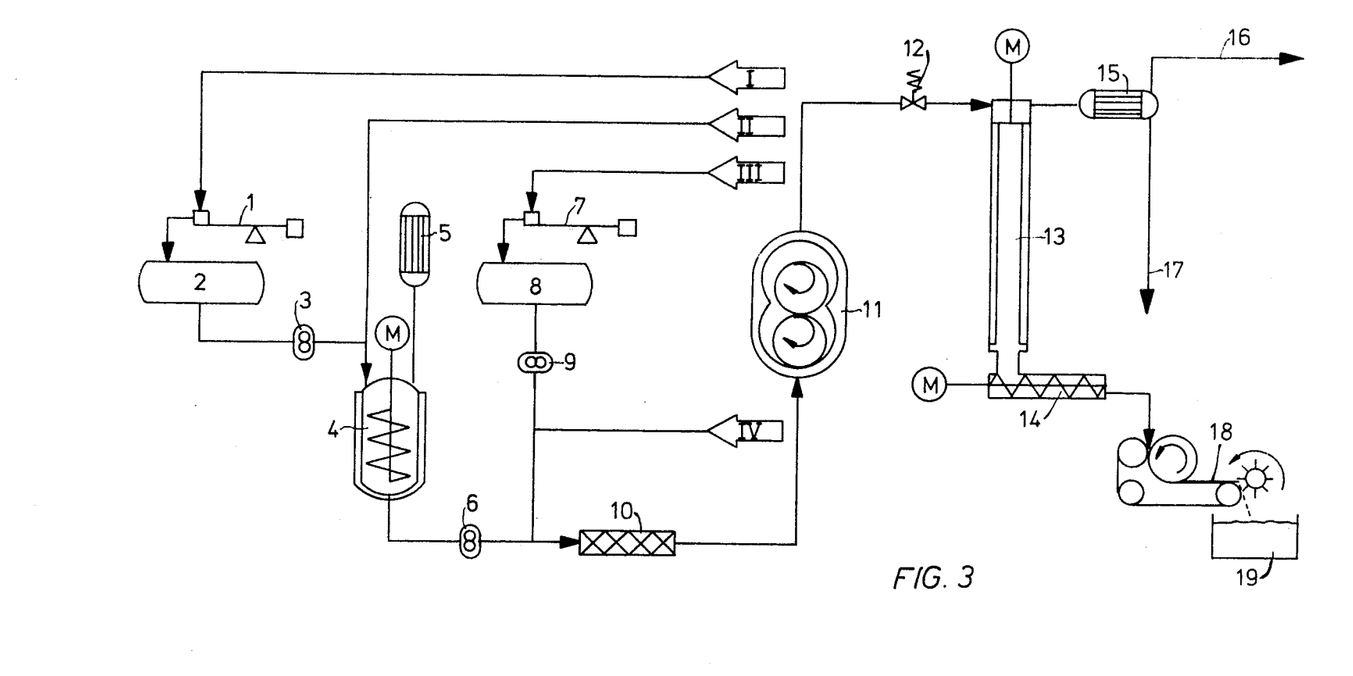

The apparatus used is illustrated in FIG. 3. I represents the monomers $A_1$, $B_1$, $C_1$ which are weighed into the storage tank 2 through the weight feeder 1. The monomer mixture is pumped continuously into the tank reactor 4 by the pump 3. The reference 5 denotes a reflux condenser. The monomer syrup is removed from the tank reactor by the pump 6 at a rate commensurate with that at which the monomers are introduced by the pump 3. II is the initiator for process stage 1. For process stage 2, the monomers $A_1$, $B_2$, $C_2$, in this case denoted by the reference III, are weighed into the storage tank 8 through the weigh feeder 7 and are mixed with the monomer syrup of the tank reactor 4 in the static mixer 10 by way of the metering pump 9. The peroxides for process stage 3 are added to the product stream through IV.

The mixture monomer syrup and monomers $A_2B_2C_2$ of process stage 2 is introduced into the flooded polymerisation kneader 11 and the polymerisation product is run off from the kneader at the same rate by way of the relief valve 12. In the high viscosity evaporator 13, the residual monomers are removed and condensed through the condenser 15. 17 leads to the working up stage for the residual monomers, and 16 leads to a vacuum pump. The polymer ABC is discharged by means of a discharge screw 14 onto a cooling belt 18, and is then granulated into the end product 19. M=stirrer.

ABBREVIATIONS

S = styrene
AN = acrylonitrile
MA = maleic acid anhydride
VA = vinyl acetate
AM = methyl acrylate
MAS = methacrylic acid
MAN = methacrylonitrile
MS = α-methyl styrene.

| Process stage 1) | Example 1: |
|---|---|
| Monomer mixture I, $A_1B_1C_1$, stabilised with 500 ppm of 2,6-di-tert.-butyl-p-cresol | 75% by weight of S = 62.72 mol %<br>20% by weight of AN = 32.83 mol %<br>5% by weight of MA = 4.44 mole % |
| Dosage, parts by weight/h | 2 |
| Peroxide I, % by weight based on monomer I | 0.03 tert.-butyl perpivalate |
| Average residence time, mins | 60 |
| Mixing time, secs. | 15 |
| Conversion, % by weight, based on monomer mixture I | 27.0 |
| Conversion, mol %, based on monomer mixture I | 26.7 |
| Temperature, ° C. | 95 |
| Residual monomer composition, % by weight, gas chromatography (residual monomer I), | 78.6 S<br>20.8 AN<br>0.6 18.18 |
| Polymer composition (ABC), mol % | 55.3 S<br>29.7 AN<br>15.0 MA |
| Process stage 2) | |
| Monomer composition II, $A_2B_2C_2$, stabilised with 500 ppm of 2,6-di-tert.-butyl-p-cresol | 45.87% by weight of S = 39.69 mol %<br>13.60% by weight of AN = 23.09 mol %<br>40.53% by weight of MA = 37.22 mol % |
| Dosage, parts by weight/h | 0.54 |
| Peroxide II, % by weight, based on residual monomer I and monomer II | 0.2 di-tert.-butyl peroxide |
| Process stage 3) | |
| Average residence time, mins | 20 |
| Mixing time, secs. | 30 |
| Conversion, % by weight, based on monomer I and monomer II | 74 |
| Temperature, ° C. | 170 |
| Residual monomer content, mol %, based on monomers I and II | 26.9 |
| Polymer composition | 57.08 S |

|                                                                   | -continued                                                                     |
| ----------------------------------------------------------------- | ------------------------------------------------------------------------------ |
| ($A_1B_1C_1$), mol %                                              | 28.45 AN                                                                       |
|                                                                   | 14.47 MA                                                                       |
| Dimensional Stability under heat according to Vicat, DIN 53 460, °C. | 124                                                                         |
| Notched impact strength, DIN 53453, cmkp/cm²                      | 3.0                                                                            |
| Impact strength, DIN 53 453, 20°, kpcm/cm²                        | 20                                                                             |
| Flexural strength DIN 53 452, kp/cm²                              | 1200                                                                           |
| Melt index, 200° C., 21.6 kp, ASTM 1238-65 T, g/10'               | 13                                                                             |
| Conversion, mol %, based on monomer I and monomer II              | 73.1                                                                           |
| Appearance of small standard test bars (5 × 6 × 50 mm)            | transparent - clear, completely colourless or with pale yellow tinges          |
| Intrinsic viscosity, 25° C. in DMF (dimethyl formamide)           | 0.86 dl/g                                                                      |
| Process stage 1)                                                  | Example 2:                                                                     |
| Monomer mixture I, $A_1B_1C_1$, stabilised with 500 ppm of 2,6-di-tert.-butyl-p-cresol | 0.2% by weight of cyclohexene (regulator)             |
|                                                                   | 73.4% by weight of S   = 60.67 mol %                                           |
|                                                                   | 21.7 % by weight of AN = 35.20 mol %                                           |
|                                                                   | 4.7% by weight of MA =  4.13 mol %                                             |
| Dosage, parts by weight/h                                         | 2                                                                              |
| Peroxide I, % by weight, based on monomer I                       | 0.075                                                                          |
|                                                                   | tert.-butyl perpivalate                                                        |
| Average residence time, mins.                                     | 60                                                                             |
| Mixing time, secs.                                                | 20                                                                             |
| Conversion, % by weight, based on monomer mixture I               | 40                                                                             |
| Conversion, mol %, based on monomer mixture I                     | 39                                                                             |
| Temperature, ° C.                                                 | 94                                                                             |
| Residual monomer composition, % by weight, gas chromatography (residual monomer I), | 77.0 S                                             |
|                                                                   | 22.6 AN                                                                        |
|                                                                   | 0.4 MA                                                                         |
| Polymer composition (ABC), mol %                                  | 56.8 S                                                                         |
|                                                                   | 33.2 AN                                                                        |
|                                                                   | 10.0 MA                                                                        |
| Process stage 2)                                                  |                                                                                |
| Monomer composition II $A_2B_2C_2$, stabilised with 500 ppm of 2,6-di-tert.-butyl-p-cresol | 68.4% by weight of S   = 56.85 mol %                  |
|                                                                   | 20.4% by weight of AN = 33.27 mol %                                            |
|                                                                   | 11.2% by weight of MA =  9.88 mol %                                            |
| Dosage, parts by weight/h                                         | 0.80                                                                           |
| Peroxide II, % by weight, based on residual monomer I and monomer II | 0.1 di-tert.-butyl peroxide                                                |
| Process stage 3)                                                  |                                                                                |
| Average residence time, mins.                                     | 20                                                                             |
| Mixing time, secs.                                                | 25                                                                             |
| Conversion, % by weight, based on monomer I and monomer II        | 56                                                                             |
| Temperature, ° C.                                                 | 165                                                                            |
| Residual monomer content, mol %, based on monomers I and II       | 45.0                                                                           |
| Polymer composition (ABC), mol %                                  | 57.54 S                                                                        |
|                                                                   | 32.73 AN                                                                       |
|                                                                   | 9.73 MA                                                                        |
| Dimensional stability under heat according to Vicat, DIN 53460, °C. | 120                                                                          |
| Notched impact strength, DIN 53453, cmkp/cm²                      | 4                                                                              |
| Melt index, 200° C., 21.6 kp ASTM 1238-65 T, g/10                 | 9                                                                              |
| Conversion, mol %, based on monomer I and monomer II              | 55                                                                             |
| Impact strength, DIN 53 453, 20°, kpcm/cm²                        | 23                                                                             |
| Flexural strength DIN 53 452 kp/cm²                               | 1200                                                                           |
| Appearance of the standard small test bars 6 × 5 × 50mm           | clear - transparent, completely colourless or with pale yellow tinges          |
| Intrinsic viscosity, 25° C. in DMF                                | 0.68 dl/g                                                                      |
| Process stage 1)                                                  | Example 3:                                                                     |
| Monomer mixture I, $A_1B_1C_1$, stabilised with 500 ppm of 2,6-di-tert.-butyl-p-cresol | 0.1% by weight of dodecyl mercaptan                   |
|                                                                   | 94.6% by weight of S   = 92.31 mol %                                           |
|                                                                   | 2.5% by weight of AN =  4.79 mol %                                             |
|                                                                   | 2.8% by weight of MA =  2.90 mol %                                             |
| Dosage, parts by weight/h                                         | 2                                                                              |
| Peroxide I, % by weight, based on monomer I                       | 0.075 tert.-butyl perpivalate                                                  |

-continued

| | |
|---|---|
| Average residence time, mins. | 60 |
| Mixing time, secs. | 25 |
| Conversion, % by weight, based on monomer mixture I | 37 |
| Conversion, mol %, based on monomer mixture I | 36.8 |
| Temperature, °C. | 98 |
| Residual monomer composition, % by weight, gas chromatography (residual monomer I), | 96.6 S<br>3.0 AN<br>0.4 MA |
| Polymer composition (ABC), mol % | 89.8 S<br>3.1 AN<br>7.1 MA |
| Process stage 2) | |
| Monomer composition II, $A_2B_2C_2$, stabilised with 500 ppm of 2,6-di-tert.-butyl-p-cresol | 86.41% by weight of S  = 85.58 mol %<br>0.18% by weight of AN = 0.35 mol %<br>13.39% by weight of MA = 14.07 mol % |
| Dosage, parts by weight/h | 0.74 |
| Peroxide II, % by weight, based on residual monomer I and monomer II | 0.2 di-tert.-butyl peroxide |
| Process stage 3) | |
| Average residence time, mins. | 20 |
| Mixing time, secs. | 25 |
| Conversion, % by weight, based on monomer I and monomer II | 81.7 |
| Temperature, °C. | 186 |
| Residual monomer content, mol %, based on monomers I and II | 18.1 |
| Polymer composition ($A_1B_1C_1$), mol % | 88.91 S<br>3.83 AN<br>7.2 MA |
| Dimensional stability under heat according to Vicat, DIN 53 460, °C. | 126 |
| Notched impact strength, DTN 53453, cmkp/cm$^2$ | 4 |
| Impact strength, DIN 53 453, 20°, kpcm/cm$^2$ | 21 |
| Flexural strength, 20°, DIN 53 452, kp/cm$^2$ | 1240 |
| Melt index, 200° C, 21.6 kp, ASTM 1238-65 T, g/10' | 14 |
| Conversion, mol %, based on monomer I and monomer II | 81.9 |
| Appearance of the standard small test bars 6 × 5 × 50 mm | clear-transparent, colourless |
| Intrinsic viscosity, 25° C in DMF | 0.7 dl/g |

| Process stage 1) | Example 4: |
|---|---|
| Monomer mixture I, $A_1B_1C_1$, stabilised with 500 ppm of 2,6-di-tert.-butyl-p-cresol | 92.7% by weight of S  = 91.79 mol %<br>3.7% by weight of VA = 4.43 mol %<br>3.6% by weight of MA = 3.78 mol % |
| Dosage, parts by weight/h | 2 |
| Peroxide I, % by weight, based on monomer I | 0.075<br>tert.-butyl perpivalate |
| Average residence time, mins. | 60 |
| Mixing time, secs. | 10 |
| Conversion, % by weight, based on monomer mixture I | 40 |
| Conversion, mol %, based on monomer mixture I | 39.98 |
| Temperature, °C. | 110 |
| Residual monomer composition, % by weight, gas chromatography (residual monomer I), | 94.9 S<br>5.0 VA<br>0.1 MA |
| Polymer composition (ABC), mol % | 88.55 S<br>2.18 VA<br>9.26 MA |
| Process stage 2) | |
| Monomer composition II $A_2B_2C_2$, stabilised with 500 ppm of di-tert.-butyl-p-cresol | 89.4% by weight of S  = 88.59 mol %<br>1.8% by weight of VA = 2.16 mol %<br>8.8% by weight of MA = 9.25 mol % |
| Dosage, parts by weight/h | 0.80 |
| Peroxide II, % by weight, based on residual monomer I and monomer II | 0.1 tert.-butyl perbenzoate |
| Process stage 3) | |
| Average residence time, mins | 20 |
| Mixing time, secs. | 30 |
| Conversion, % by weight, based on monomer I and monomer II | 50 |

|  | -continued |
|---|---|
| Temperature, °C. | 150 |
| Residual monomer content, mol %, based on monomers I and II | 50 |
| Polymer composition (ABC), mol % | 88.5 S<br>2.0 VA<br>9.5 MA |
| Dimensional stability under heat according to Vicat, DIN 53 460, °C. | 110 |
| Notched impact strength, DIN 53453, cmkp/cm² | 4 |
| Melt index, 200° C., 21.6 kp, ASTM 1238-65 T, g/10' | 14 |
| Conversion, mol %, based on monomer I and monomer II | 49 |
| Impact strength DIN 53 453, 20° kpcm/cm² | 23 |
| Appearance of the standard small test bars 6 × 5 × 50 mm | clear-transparent, colourless |
| Intrinsic viscosity, 25° in DMF | 0.6 dl/g |

| Process stage 1) | Example 5: |
|---|---|
| Monomer mixture I, $A_1B_1C_1$, stabilised with 500 ppm of 2,6-di-tert.-butyl-p-cresol | 31.9% by weight of S = 19.99 mol %<br>60.2% by weight of AN = 74.02 mol %<br>7.9% by weight of AM = 5.99 mol % |
| Dosage, parts by weight/h | 2 |
| Peroxide I, % by weight, based on monomer I | 0.1<br>tert.-butyl perpivalate |
| Average residence time, mins. | 60 |
| Mixing time, secs. | 10 |
| Conversion, % by weight, based on monomer mixture I | 35 |
| Conversion, mol %, based on monomer mixture I | 34.4 |
| Temperature, °C. | 92 |
| Residual monomer composition, % by weight, gas chromatography (residual monomer I), | 20.0 S<br>70.0 AN<br>10.0 AM |
| Polymer composition (ABC), mol % | 38.2 S<br>58.4 AN<br>3.4 AM |

| Process stage 2) | |
|---|---|
| Monomer composition II $A_2B_2C_2$, stabilised with 500 ppm of 2,6-di-tert.-butyl-p-cresol | 68.58% by weight = 53.10 mol %<br>29.99% by weight = 45.56 mol %<br>1.43% by weight = 1.34 mol % |
| Dosage, parts by weight/h | 0.7 |
| Peroxide II, % by weight, based on residual monomer I and monomer II | 0.1 tert.-butyl perbenzoate |

| Process stage 3) | |
|---|---|
| Average residence time, mins. | 20 |
| Mixing time, secs. | 24 |
| Conversion, % by weight, based on monomer I and monomer II | 62.9 |
| Temperature, °C. | 175 |
| Residual monomer content, mol %, based on monomers I and II | 39 |
| Polymer composition (ABC), mol % | 38.0 S<br>58.1 AN<br>3.9 AM |
| Dimensional stability under heat according to Vicat, DIN 53 460, °C. | 90 |
| Notched impact strength, DIN 53453, cmkp/cm² | 2.5 |
| Melt index, 200° C., 21.6 kp, ASTM 1238-65 T, g/10' | 2.8 |
| Conversion, mol %, based on monomer I and monomer II | 61 |
| Intrinsic viscosity, 25° C. in DMF | 0.9 dl/g |
| Appearance of the standard small test bars 5 × 6 × 50 mm | clear - transparent, pale yellowish in colour |

| Process stage 1) | Example 6: |
|---|---|
| Monomer mixture I, $A_1B_1C_1$, stabilised with 500 ppm of 2,6-di-tert.-butyl-p-cresol | 95% by weight of S = 94.71 mol %<br>5% by weight of MA = 5.29 mol % |
| Dosage, parts by weight /h | 2 |
| Peroxide I, % by weight, based on monomer I | 0.02 tert.-butyl peroctoate |
| Average residence time, mins. | 30 |

-continued

| | |
|---|---|
| Mixing time, secs. | 15 |
| Conversion, % by weight, based on monomer mixture I | 34 |
| Conversion, mol %, based on monomer mixture I | 34.17 |
| Temperature, ° C. | 135° |
| Residual monomer composition, % by weight, gas chromatography (residual monomer I) | 99.38 S<br>0.62 MA |
| Polymer composition (ABC), isolated by precipitation | 86.5% by weight = 85.79 mol % of S<br>13.5% by weight = 14.21 mol % of MA |
| Process stage 2) | |
| Monomer compositon II, $A_2B_2C_2$, stabilised with 500 ppm of 2,6-di-tert.-p-cresol | 77.01% by weight of S = 75.95 mol %<br>22.99% by weight of MA = 24.05 mol % |
| Dosage, % by weight, parts/h | 0.78 |
| Peroxide II, % by weight, based on residual monomer I and monomer II | 0.2 tert.-butyl perbenzoate |
| Process stage 3) | |
| Average residence time, mins. | 120 |
| Mixing time, secs. | 45 |
| Conversion, % by weight, based on residual monomer I and II | 70.15 |
| Conversion, mol %, based on monomer I and monomer II | 70.5 |
| Temperature, ° C. | 140 |
| Residual monomer content, mol %, based on monomer I and II | 29.5 |
| Polymer composition (ABC) | 86.7% by weight of S = 86.0 mol %<br>13.3% by weight of MA = 14.0 mol % |
| Intrinsic viscosity, 25° C. in DMF | 0.5 dl/g |
| Dimensional stability under heat according to Vicat, DIN 53 460, ° C. | 126 |
| Notched impact strength, DIN 53 453, cmkp/cm$^2$ | 2.0 |
| Impact strength, DIN 53 453, 20° kpcm/cm$^2$ | 15 |
| Melt index, 200° C.,21.6 kp, ASTM D 1238-65 T | 12.8 |
| Flexural strength, DIN 53 452, kp/cm$^2$ | 1006 |
| Appearance of the standard small test bars 6 × 5 × 50 mm | clear, transparent, colourless |

| Process stage 1) | Example 7: |
|---|---|
| Monomer mixture I, $A_1B_1C_1$, stabilised with 500 ppm of 2,6-di-tert.-butyl-p-cresol | 72.2% by weight of S = 58.14 mol %<br>24.4% by weight of AN = 38.56 mol %<br>3.4% by weight of MAS = 3.30 mol % |
| Dosage, parts by weight/h | 2 |
| Peroxide I, % by weight, based on monomer I | 0.04 azodiisobutyrodnitrile |
| Average residence time, mins. | 60 |
| Mixing time, secs. | 10 |
| Conversion, % by weight, based on monomer mixture I | 32 |
| Conversion, mol %, based on monomer mixture I | 33.7 |
| Temperature, ° C. | 93° |
| Residual monomer composition, % by weight, gas chromatography (residual monomer I) | 72.0 S<br>25.0 AN<br>3.0 MAS |
| Polymer composition (ABC), isolated by precipitation | 72.6% by weight of S = 58.97 mol %<br>23.1% by weight of AN = 36.81 mol %<br>4.3% by weight of MAS = 4.22 mol % |
| Process stage 2) | |
| Monomer composition II, $A_2B_2C_2$, stabilised with 500 ppm of 2,6-di-tert.-butyl-p-cresol | 73.5 % by weight of S = 64.6 mol %<br>20.50% by weight of AN = 35.4 mol %<br>6.0 % by weight of MAS = 0.04 mol % |
| Dosage, % by weight, parts/h | 0.64 |
| Peroxide II, % by weight, based on residual monomer I and monomer II | 0.40 di-tert.-butyl peroxide |
| Process stage 3) | |
| Average residence time, mins. | 30 |
| Mixing time, secs. | 60 |
| Conversion, % by weight, based on residual monomer I and monomer II | 84 |
| Conversion, mol %, based on monomer I and monomer II | 86.15 |
| Temperature, ° C. | 180 |

| | -continued |
|---|---|
| Residual monomer content, mol %, based on monomer I and II | 13.85 |
| Polymer composition (ABC) | 72.5% by weight of S = 58.84 mol %<br>23.2% by weight of AN = 36.94 mol %<br>4.3% by weight of MAS = 4.22 mol % |
| Intrinsic viscosity, 25° C. in DMF | 0.68 dl/g |
| Dimensional stability under heat according to Vicat, DIN 53 460, ° C. | 102 |
| Notched impact strength, DIN 53 453, cmkp/cm$^2$ | 3 |
| Impact strength, DIN 53 453, 20°, kpcm/cm$^2$ | 20 |
| Melt index, 200° C.,21.6 kp, ASTM D 12 38-65 T | 15 |
| Flexural strength DIN 53 452, kp/cm$^2$ | 1150 |
| Appearance of the standard small test bars 6 × 5 × 50 mm | clear - transparent, colourless |

| Process Stage 1) | Example 8: |
|---|---|
| monomer mixture I, $A_1B_1C_1$, stabilised with 500 ppm of di-tert-butyl-p-cresol | 15.95% by weight of S = 9.97 mol %<br>56.50% by weight of AN = 69.23 mol %<br>27.55% by weight of NA = 20.80 mol % |
| Dosage, parts by weight/h | 2 |
| Peroxide I, % by weight, based on monomer I | 0.2 azodiisobutyronitrile |
| Average residence time,mins. | 60 |
| Mixing time, secs. | 15 |
| Conversion, % by weight, based on monomer mixture I | 35 |
| Conversion, mol %, based on monomer mixture I | 33.43 |
| Temperature, ° C. | 80° |
| Residual monomer composition, % by weight, gas chromatograhy (residual monomer I) | 10% by weight of S<br>60% by weight of AN<br>30% by weight of VA |
| Polymer composition (ABC), isolated by precipitation | 27% by weight of S = 17.66 mol %<br>50% by weight of AN = 64.16 mol %<br>23% by weight of VA = 18.18 mol % |
| Process Stage 2) | |
| Monomer composition II ($A_2B_2C_2$), stabilised with 500 ppm of 2,6-di-tert-butyl | 53.75% by weight of S = 39.40 mol %<br>35.50% by weight of AN = 51.06 mol %<br>10.75% by weight of VA = 9.54 mol % |
| Dosage, parts by weight/h | 0.4 |
| Peroxide II, % by weight, based on residual monomer I and monomer II | 0.5 di-tert-butyl peroxide |
| Process Stage 3) | |
| Average residence time, mins. | 30 |
| Mixing time, secs. | 60 |
| Conversion, % by weight, based on residual monomer I and monomer II | 70.83 |
| Conversion, mol %, based on monomer I and monomer II | 69.38 |
| Temperature ° C. | 170 |
| Residual monomer content, mol %, based on monomer I and II | 30.62 |
| Polymer composition (ABC) | 27.5% by weight of S = 17.98 mol %<br>50.2% by weight of AN = 64.39 mol %<br>22.3% by weight of VA = 17.63 mol % |
| Intrinsic viscosity, 25° C in DMF | 0.58 dl/g |
| Dimensional stability under heat according to Vicat, DIN 53460, ° C. | 90 |
| Notched impact strength DIN 53453, cmkp/cm$^2$ | 4 |
| Impact strength, DIN 53453, 20°, kpcm/cm$^2$ | 22 |
| Melt index, 200° C.,21.6 kp, ASTM D 1238-65 T | 15 |
| Flexural strength, DIN 53 452, kp/cm$^2$ | 1190 |
| Appearance of the standard small test bars 6 × 5 × 50 mm | clear-transparent, slight yellow tinge |

| Process Stage 1) | Example 9: |
|---|---|
| Monomer mixture I, $A_1B_1C_1$, stabilised with 500 ppm of 2,6-di-tert-butyl-p-cresol | 26.3% by weight of S = 17.18 mol %<br>33.8% by weight of AN = 43.44 mol %<br>36.8% by weight of MAN = 37.31 mol %<br>3.0% by weight of MA = 2.08 mol %<br>0.1% by weight of n-dodecylmercaptan |
| Dosage, parts by weight/h | 2 |
| Peroxide I, % by weight, based on monomer I | 0.03 tert-butyl perpivalate |
| Average residence time, mins. | 60 |
| Mixing time, secs. | 15 |

-continued

| | |
|---|---|
| Conversion, % by weight, based on monomer mixture I | 31 |
| Conversion, mol %, based on monomer mixture I | 27.64 |
| Temperature, °C. | 195 |
| Residual monomer composition, % by weight, gas chromatography (residual monomer) | 18.90% by weight<br>40.00% by weight<br>40.00% by weight<br>1.1 % by weight |
| Polymer compositions (ABC), isolated by precipitation | 42.75% by weight of S = 31.31 mol %<br>20.40% by weight of AN = 29.31 mol %<br>29.86% by weight of MAN = 33.95 mol %<br>69.90% by weight of MA = 5.43 mol % |
| Process Stage 2) | |
| Monomer composition II, $A_2B_2C_2$, stabilised with 500 ppm of di-tert-butyl-p-cresol | 68.23% by weight of S = 61.28 mol %<br>0.00% by weight of AN = 0.00 mol %<br>12.65% by weight of MA = 12.06 mol % |
| Dosage,% by weight, parts/h | 0.78 |
| Peroxide II, % by weight, based on residual monomer I and monomer II | 0.4 di-tert-butyl perbenzoate |
| Process Stage 3) | |
| Average residence time, mins. | 20 |
| Mixing time, secs. | 60 |
| Conversion, % by weight, based on residual monomer I and monomer II | 75.26 |
| Conversion, mol %, based on monomer I and monomer II | 72.16 |
| Temperature, °C. | 160 |
| Residual monomer content, mol %, based on monomers I and II | 27.84 |
| Polymer composition (ABC) | 43.0% by weight of S = 31.48 mol %<br>20.5% by weight of AN = 29.45 mol %<br>29.8% by weight of MAN = 33.86 mol %<br>6.7% by weight of MA = 5.21 mol % |
| Intrinsic viscosity, 25° C. in DMF | 0.8 dl/g |
| Dimensional stability under heat according to Vicat, DIN 53 460, °C. | 115° |
| Notched impact strength, DIN 53 453, cmkp/cm$^2$ | 4 |
| Impact strength, DIN 53 453, 20°, kpcm/cm$^2$ | 22 |
| Melt index, 200° C.,21.5 kp, ASTM D 1238-65 T | 105 |
| Flexural strength DIN 53 452, kp/cm$^2$ | 1350 |
| Appearance of the standard small test bars 6 × 5 × 50 mm | clear - transparent, yellowish in colour |
| Process Stage 1) | Example 10: |
| Monomer mixture I, $A_1B_1C_2$, stabilised with 500 ppm of 2,6-di-tert-butyl-p-cresol | 72.0% by weight of S = 63.06 mol %<br>25.39% by weight of MAN = 34.52 mol %<br>2.61% by weight of MA = 2.42 mol % |
| Dosage, parts by weight/h | 2 |
| Peroxide I, % by weight, based on Monomer I | 0.06 azodiisobutyronitrile |
| Average residence time, mins. | 60 |
| Mixing time, secs. | 15 |
| Conversion, % by weight, based on monomer mixture I | 49 |
| Conversion, mol %, based on monomer mixture I | 31.16 |
| Temperature, °C. | 105 |
| Residual monomer composition, % by weight, gas chromatography (residual monomer I) | 74.8% by weight of S<br>25.0% by weight of MAN<br>0.2% by weight of MA |
| Polymer composition (ABC), isolated by precipitation | 69.1% by weight of styrene = 60.32 mol %<br>25.8% by weight of MAN = 34.96 mol %<br>5.1% by weight of MA = 4.72 mol % |
| Process Stage 2) | |
| Monomer composition II, $A_2B_2C_2$, stabilised with 500 ppm of 2,6-di-tert-butyl-p-cresol (added in paste form) | 0.0% by weight of S = 0 mol %<br>37.5% by weight of MAN = 46.7 mol %<br>62.5% by weight of MA = 53.3 mol % |
| Dosage, % by weight, parts/h | 0.024 = 1.2 parts by weight, based on 100 parts by weight of monomer $A_1B_1C_1$ |
| Peroxide II, % by weight, based on residual monomer I and monomer II | 0.05 tert-butyl peroctoate |
| Process Stage 3) | |
| Average residence time, mins. | 15 |
| Mixing time, secs. | 45 |
| Conversion, % by weight, based on residual monomer I and monomer II | 63.24 |
| Conversion, mol %, based on | |

-continued

| | |
|---|---|
| monomer I and monomer II | 64.69 |
| Temperature, °C. | 150 |
| Residual monomer content, mol %, based on monomers I and II | 35.31 |
| Polymer composition (ABC) | 69.0% by weight of S = 60.18 mol % |
| | 26.0% by weight of MAN = 35.20 mol % |
| | 5.0% by weight of MA = 4.63 |
| Intrinsic viscosity, 25° C. in DMF | 0.84 dl/g |
| Dimensional stability under heat according to Vicat, DIN 53 460, °C. | 1170 |
| Notched impact strength DIN 53 453, cmkp/cm$^2$ | 3 |
| Impact strength, DIN 53 453, 20°, kpcm/cm$^2$ | 15 |
| Melt index, 200° C.,21.6 kp, ASTM D 1238-65 T | 6 |
| Flexural strength, DIN 53 452, kp/cm$^2$ | 1170 |
| Appearance of the standard small test bars 6 × 5 × 50 mm | clear - transparent, pale yellowish in colour |

| Process Stage 1) | Example 11: |
|---|---|
| Monomer mixture I, A$_1$B$_1$C$_1$, stabilised with 500 ppm of 2,6-di-tert-butyl-p-cresol | + 0.2% by weight of tert-dodecyl mercaptan, based on A$_1$B$_1$C$_1$ |
| | 27.11% by weight of S = 22.10 mol % |
| | 43.94% by weight of MS = 31.58 mol % |
| | 28.95% by weight of AN = 46.32 mol % |
| Dosage, parts by weight/h | 1 |
| Peroxide I, % by weight, based on monomer I | 0.1 tert-butyl perpivalate |
| Average residence time, mins. | 120 |
| Mixing time, secs. | 30 |
| Conversion, % by weight, based on monomer mixture I | 35 |
| Conversion, mol %, based on monomer mixture I | 33.16 |
| Temperature, °C. | 90 |
| Residual monomer composition, % by weight, gas chromatography (residual monomer I) | 30% by weight of S = 23.78 mol % |
| | 38.15% by weight of MS = 26.67 mol % |
| | 31.85% by weight of AN = 49.65 mol % |
| Polymer composition (ABC), isolated by precipitation | 21.74% by weight of S = 18.71 mol % |
| | 54.68% by weight of MS = 41.47 mol % |
| | 23.58% by weight of AN = 39.82 mol % |

| Process Stage 2) | |
|---|---|
| Monomer composition II, A$_2$B$_2$C$_2$, stabilised with 500 ppm of 2,6-di-tert-butyl-p-cresol | 0% by weight of S = 0 mol % |
| | 100% by weight of MS = 100 mol % |
| | 0% by weight of AN = 0 mol % |
| Dosage, % by weight, parts/h | 0.17 |
| Peroxide II, % by weight, based on residual monomer I and monomer II | 0.5 di-tert-butyl peroxide |

| Process Stage 3) | |
|---|---|
| Average residence time, mins | 50 |
| Mixing time, secs. | 120 |
| Conversion, % by weight, based on residual monomer I and monomer II | 85.47 |
| Conversion, mol %, based on monomer I and monomer II | 84.45 |
| Temperature, °C. | 170° |
| Residual monomer content, mol %, based on monomer I and II | 15.55 |
| Polymer composition (ABC) | 21.7% by weight of S = 18.7 mol % |
| | 54.7% by weight of MS = 41.4 mol % |
| | 23.6% by weight of AN = 39.9 mol % |
| Intrinsic viscosity, 25° C. in DMF | 0.6 dl/g |
| Dimensional stability under heat according to Vicat, DIN 53 460, °C. | 115° |
| Notched impact strength, DIN 53 453, cmkp/cm$^2$ | 3 |
| Impact strength, DIN 53 453, 20°, kpcm/cm$^2$ | 20 |
| Melt index, 200° C.,21.6 kp, ASTM D 1238-65 T | 13 |
| Flexural strength, DIN 53 452, kp/cm$^2$ | 1250 |
| Appearance of the standard small test bars 6 × 5 × 50 mm | clear, transparent, pale yellow tinge |

We claim:

1. A process for the continuous production of a thermoplastic moulding composition comprising a statistical copolymer having an intrinsic viscosity of from 0.1 to 2 dl/g, as measured in dimethyl formamide at 25° C., and a dimension stability under heat of from 90° C. to 130° C., and consisting of copolymerised units of A 22 to 96 mol % of styrene or α-methyl styrene or a mixture thereof, B 0 to 78 mol % of at least one monoolefinically unsaturated monomer containing a nitrile group, and C 0 to 50 mol % of at least one monoolefinically unsaturated monomer different from A and B, wherein the sum of A, B and C amounts to 100 mol %, the process comprising the following steps: a first process step carried out at a temperature of from 60° C. to 150° C. and under a pressure of from 1 to 20 bars, in the presence of an initiator having a half life (at the polymerisation temperature) of $\leq 1/10$th of the average residence time and $\geq$ the mixing time in a continuous-flow, ideally mixed tank reactor, with an average residence time of from 10 to 240 minutes and mixing time of from 5 to 120 seconds, wherein 100 parts by weight of a monomer mixture of $A_1$ 4 to 99.6 mol % of styrene, α-methyl styrene or a mixture thereof, $B_1$ 0 to 96 mol % of at least one monoolefinically unsaturated monomer containing a nitrile group, and $C_1$ 0 to 80 mol % of at least one monoolefinically unsaturated monomer different from $A_1$ or $B_1$, per unit of time are continuously copolymerised in bulk with remixing up to a conversion of from 10 to 60 mol % to form a copolymer with the composition ABC; a second process step wherein from 0.5 to 100 parts by weight per unit of time of a monomer mixture consisting of $A_2$ 0 to 100 mol % of styrene, α-methyl styrene or a mixture thereof, $B_2$ 0 to 100 mol % of at least one monoolefinically unsaturated monomer containing a nitrile group, and $C_2$ 0 to 100 mol % of at least one monoolefinically unsaturated monomer different from $A_2$ or $B_2$, the sum of the mol % of $A_1B_1C_1$ and $A_2B_2C_2$, respectively, always amounting to 100, and from 0.01 to 0.5% by weight, based on the sum of residual monomers of $A_1B_1C_1$ and monomers $A_2B_2C_2$, of an initiator having a half life (at the polymerisation temperature of process stage 3) of $\leq 1/10$th of the residence time and $\geq$ than the mixing time, are added to the polymerisation mixture per unit of time; and a third process step, carried out continuously in homogeneous phase, in bulk, in a completely flooded, self-cleaning polymerisation kneader with mobile kneading fittings which sweep over the entire inner volume of the polymerisation kneader and completely strip both the wall and one another wherein, copolymerisation is continued with backmixing at a temperature of from 100° C. to 250° C. over an average residence time of from 10 to 480 minutes and with a mixing time of from 0.1 to 4 minutes, up to a residual monomer content of from 10 to 50 mol %, based on the total monomers, the copolymer ABC containing residual monomer being continuously freed from the residual monomers by applying a vacuum or by blowing in an inert gas, until the residual monomer content amounts to less than 0.5% by weight, based on the copolymer.

2. A process as claimed in claim 1, wherein the monomer mixture in step 1 consists of 4 to 99.6 mol of $A_1$, 0 to 70 mol % of $B_1$ and 0.4 to 50 mol % of $C_1$; and, in step 2, from 0.5 to 60 parts by weight per unit of time of a monomer mixture of 0 to 100 mol % of $A_2$, 0 to 100 mol % of $B_2$ and 0.4 to 100 mol % of $C_2$, are used.

3. A thermoplastic moulding composition when produced by a process as claimed in claim 1.

4. A thermoplastic moulding composition of claim 3 wherein $A_1$ and $A_2$ are each styrene, $B_1$ and $B_2$ are each acrylonitrile and $C_1$ and $C_2$ are each maleic acid anhydride.

* * * * *